Patented Dec. 30, 1941

2,268,398

UNITED STATES PATENT OFFICE 2,268,398

TREATMENT OF RUBBER

Louis H. Howland, Nutley, N. J., assignor, by mesne assignments, to United States Rubber Company, New York, N. Y., a corporation of New Jersey No Drawing. Application March 1, 1938,
Serial No. 193,285

12 Claims. (Cl. 260—784)

This invention relates to improvements in manufacture of vulcanized rubber goods, and more particularly to a new class of vulcanization accelerators.

According to the invention a vulcanizable rubber stock is vulcanized in the presence of a heterocyclic 5-membered ring mercapto compound having a nucleus of the Formula A:

(A) 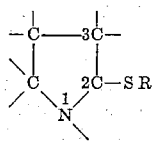

in which R represents H or a substitute radical.

In the preferred class of (B) 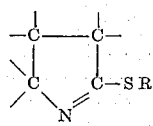

accelerators, the hetero N atom is doubly bonded to the mercapto-substituted C atom. Mercaptans of such structure (B) are tautomeric and may exist in equilibrium in either the keto or enol form, but are preferably designated as having the enol form. Such compounds are typified by 3,3-dimethyl thion indoline.

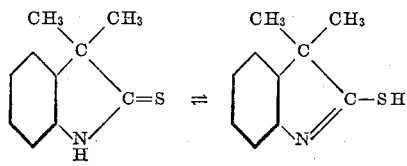

The compounds may be either mono-cyclic, or poly-cyclic, embodying an aromatic condensed ring structure as in the above example.

The accelerators may be used in the form of the free mercaptans, or of various derivatives, including the mono and polysulphides, metallic salts, ammonia or amine salts, thio-ethers hydrolyzing or decomposing to an accelerating body at vulcanization temperatures, acidyl derivatives, aldehyde derivatives, particularly formaldehyde derivatives, ketone derivatives particularly acetone derivatives. They may also be used in the presence or absence of adjuvants such as ammonia compounds, amines, amine salts, and organic bases in general, including urea and the diaryl guanidines and their acyl derivatives and salts. They may further be used in conjunction with other accelerators among which are the aldehyde amine, guanidine, guanidine salt, dithiocarbamate, xanthate, mercaptobenzothiazole, etc., types of accelerators. The materials may be used either in their pure or less pure forms.

Exemplary of preferred compounds falling within the scope of the invention are 2-mercapto pyrrole, 2,5 dimercapto pyrrole, 2-mercapto pyrroline; 2,5 dimercapto pyrroline, 2-thion indoline, 3,3 dialkyl-2-thion indolines, etc.

To allustrate the behavior of the new class of accelerators, the following examples are given, the parts being by weight:

Example 1.—3,3-dimethyl thion indoline for the test was prepared as follows:

10 grams of 3,3-dimethyl oxindol and 16 grams of phosphorus pentasulphide ($P_2S_5$) were ground together in a mortar and then placed in a 500 cc. round bottomed flask containing 150 cc. of xylene. The reaction mixture was refluxed for four hours in an oil bath (oil bath temperature was 155° C.) and then was filtered while still hot. On cooling of the filtrate, 5.9 grams of tannish yellow crystals separated. This product was recrystallized from xylene. Yield of material melting at 99–102° C. was 5.5 gms. (50.6% of theory).

The recrystallized material melted at 108° C. The sulphur analysis was as follows:

|  | Found | Theory |
|---|---|---|
| Percent sulphur | 18.3 | 18.1 |

A mix was made containing 100 parts of rubber, 10 parts of zinc oxide, 2 parts of stearic acid, 3 parts of sulphur, and 0.5 part of 3,3-dimethyl thion indoline. The mix was cured 60' at 30#. The tensile and percent elongation at break is as follows:

|  | T | E |
|---|---|---|
| 60' at 30# | 2,222 | Percent 850 |

Example 2.—A mix was made containing 100 parts of rubber, 10 parts of zinc oxide, 2 parts of stearic acid, 3 parts of sulphur, and 0.5 part of 2-mercapto pyrroline

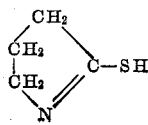

The mix was cured 30 minutes and 60 minutes at 30 lbs. per square inch steam pressure. The tensile and percent elongation at break are as follows:

|  | T | E |
|---|---|---|
| 30′ at 30# | 3,525 | 800 |
| 60′ at 30# | 3,462 | 790 |

T=Tensile at break (lbs./sq. in.).
E=Percent elongation at break.

The new accelerators may be added to the rubber by mill incorporation, by impregnation, by addition to latex or other dispersions thereof, or the rubber may be vulcanized in aqueous or organic solutions of the accelerator. The accelerators may be used in a variety of rubber mixes, and the stocks subjected either to mold cures, air cures, ammonia cures, submarine cures, steam cures, etc.

Various compounding ingredients such as fillers, pigments, softeners, anti-oxidants, anti-scorchers, or vulcanization retarders may be employed in practicing the invention. The accelerators may be used in the vulcanization of whole latex rubber or rubber recovered from latex by coagulation or separated from latex by mechanical or centrifugal creaming or chemical creaming methods as will be apparent to those skilled in the art.

The invention may be applied in the vulcanization of various vulcanizable rubbers, natural and artificially-prepared, as well as to reclaims and latices of such rubbers. The method of using the various accelerating agents herein set forth, as to the quantity employed, time of vulcanization, the heat required, and the proportions of metal oxide, sulphur and other ingredients may be varied without departing from the principle of the invention, as hereafter claimed.

Having thus described my invention, what I claim and desire to protect by Letters Patent is:

1. A process of producing vulcanized rubber products which comprises vulcanizing rubber in the presence of an accelerator embodying a 5-membered heterocyclic nucleus embodying 4 directly connected ring carbon atoms, and a ring nitrogen atom, the carbon atom in the 2-position directly adjacent the ring nitrogen atom being directly linked exteriorly of the nucleus to a sulphur atom.

2. A process of producing vulcanized rubber products which comprises vulcanizing rubber in the presence of a pyrrole-2-sulphide.

3. A process of producing vulcanized rubber products which comprises vulcanizing rubber in the presence of a pyrroline-2-sulphide.

4. A process of producing vulcanized rubber products which comprises vulcanizing rubber in the presence of a pyrrole-2-sulphide in which two of the 4 pyrrole ring carbon atoms are also adjacent carbon atoms of an arylene group.

5. A process of producing vulcanized rubber products which comprises vulcanizing rubber in the presence of a 2-thion indoline compound.

6. A process of producing vulcanized rubber products which comprises vulcanizing rubber in the presence of an alkyl-substituted 2-thion indoline compound.

7. A rubber composition having incorporated therein an accelerator embodying a 5-membered heterocyclic nucleus embodying 4 directly connected ring carbon atoms and a ring nitrogen atom, the carbon atoms in the 2-position directly adjacent the ring nitrogen atom being directly linked exteriorly of the nucleus to a sulphur atom.

8. A rubber composition having incorporated therein a pyrrole-2-sulphide.

9. A rubber composition having incorporated therein a pyrroline-2-sulphide.

10. A rubber composition having incorporated therein a pyrrole-2-sulphide in which two of the 4 pyrrol ring carbon atoms are also adjacent carbon atoms of an arylene group.

11. A rubber composition having incorporated therein a 2-thion indoline compound.

12. A rubber composition having incorporated therein an alkyl-substituted 2-thion indoline compound.

LOUIS H. HOWLAND.